(12) United States Patent
Yuan

(10) Patent No.: US 10,137,922 B2
(45) Date of Patent: Nov. 27, 2018

(54) STROLLER FRAME WITH A FOLDABLE TRAY

(71) Applicant: Wonderland Switzerland AG, Steinhausen (CH)

(72) Inventor: Jia-Liang Yuan, Hong Kong (HK)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/812,856

(22) Filed: Nov. 14, 2017

(65) Prior Publication Data

US 2018/0194385 A1 Jul. 12, 2018

(30) Foreign Application Priority Data

Jan. 6, 2017 (CN) .......................... 2017 1 0010199

(51) Int. Cl.
*B62B 7/06* (2006.01)
*B62B 9/26* (2006.01)

(52) U.S. Cl.
CPC .................. *B62B 9/26* (2013.01); *B62B 7/06* (2013.01); *B62B 2202/023* (2013.01); *B62B 2202/42* (2013.01); *B62B 2205/20* (2013.01)

(58) Field of Classification Search
CPC ........... B62B 7/06; B62B 7/062; B62B 7/064; B62B 7/10
USPC ........................................ 280/642, 647, 650
See application file for complete search history.

(56) References Cited

U.S. PATENT DOCUMENTS

| | | | | |
|---|---|---|---|---|
| 5,257,799 A * | 11/1993 | Cone | .......................... | B62B 5/04 280/47.36 |
| 7,717,457 B2 * | 5/2010 | Bearup | ................ | A61K 31/409 280/642 |
| 8,419,025 B2 * | 4/2013 | Chen | ......................... | B62B 7/10 280/47.36 |
| 8,474,854 B2 * | 7/2013 | Dean | ......................... | B62B 7/08 280/47.38 |
| 8,517,412 B2 * | 8/2013 | Tsai | .......................... | B62B 7/08 280/647 |
| 8,590,919 B2 * | 11/2013 | Yi | ............................ | B62B 7/08 280/642 |
| 8,602,442 B2 * | 12/2013 | Li | ........................... | B62B 7/062 280/642 |
| 8,622,404 B2 * | 1/2014 | Chen | ....................... | B62B 9/203 280/47.36 |
| 8,714,581 B2 * | 5/2014 | Fritz | ......................... | B62B 7/08 280/642 |
| 8,870,214 B2 * | 10/2014 | Kane | ....................... | B62B 7/062 280/647 |

(Continued)

*Primary Examiner* — Jeffrey J Restifo
(74) *Attorney, Agent, or Firm* — Hamre, Schumann, Mueller & Larson, P.C.

(57) ABSTRACT

A stroller frame includes a handle assembly, a front leg assembly and a rear leg assembly having rotating end hubs which are pivotably connected to each other about a hub axis to be rotated so as to allow the stroller frame to transform between folded and unfolded states. A tray mounting assembly is coupled with a tray, is rotatably mounted on one of two rotating end hubs, and is rotated along with the relative rotation of the end hubs to convert the tray to folded and unfolded positions. A tray latching assembly is disposed to retain and support the tray mounting assembly to keep the tray stable in the unfolded position when the stroller frame is in the unfolded state.

15 Claims, 15 Drawing Sheets

(56) References Cited

U.S. PATENT DOCUMENTS

| | | | | |
|---|---|---|---|---|
| 8,950,761 B2* | 2/2015 | Chen | ............................ | B62B 7/08 |
| | | | | 280/47.36 |
| 8,973,928 B2* | 3/2015 | Mellinger | .................. | B62B 9/26 |
| | | | | 224/409 |
| 9,050,993 B2* | 6/2015 | Pollack | ...................... | B62B 9/12 |
| 9,108,659 B2* | 8/2015 | Sparling | .................... | B62B 9/12 |
| 9,174,661 B2* | 11/2015 | Li | ............................... | B62B 7/08 |
| 9,216,755 B2* | 12/2015 | Eisinger | .................... | B62B 7/06 |
| 9,308,929 B1* | 4/2016 | Dowd | ....................... | B62B 7/062 |

* cited by examiner

STROLLER FRAME WITH A FOLDABLE TRAY

CROSS-REFERENCE TO RELATED APPLICATION

This application claims priority of Chinese Patent Application No. 201710010199.X, filed on Jan. 6, 2017.

FIELD

The disclosure relates to a stroller frame, and more particularly to a stroller frame with a foldable tray folded and unfolded along with folding and unfolding of the stroller frame.

BACKGROUND

A conventional baby stroller generally has a tray positioned across a child seat for use by a child seated on the child seat. The tray has two tray arms pivotably connected to a stroller frame to be folded and unfolded along with folding and unfolding of the stroller frame. A tolerance connection between the tray arms and the stroller frame is required to perform the folding and unfolding operations, which results in unsteady engagement therebetween, thus undesired swaying of the tray occurs during use.

SUMMARY

Therefore, an object of the disclosure is to provide a stroller frame that can alleviate at least one of the drawbacks of the prior art.

According to the disclosure, the stroller frame includes a handle assembly, a front leg assembly, a rear leg assembly, a tray, a tray mounting assembly and a tray latching assembly. The handle assembly has a first rotating end hub and a first distal end. The front leg assembly has a second rotating end hub and a second distal end. The second rotating end hub is pivotably connected with the first rotating end hub about a hub axis to be rotated relative to the first rotating end hub so as to allow the stroller frame to transform between a folded state, where the first and second distal ends are close to each other, and an unfolded state, where the first and second distal ends are remote from each other. The rear leg assembly is pivotably connected with the front leg assembly. The tray mounting assembly is coupled with the tray, and is rotatably mounted on one of the first and second rotating end hubs such that the tray mounting assembly is rotated relative to the one of the first and second rotating end hubs when the second rotating end hub is rotated relative to the first rotating end hub to move the stroller frame to one of the folded and unfolded states, thereby converting the tray to one of a folded position and an unfolded position. The tray latching assembly is disposed to retain and support the tray mounting assembly when the stroller frame is in the unfolded state so as to keep the tray in the unfolded position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
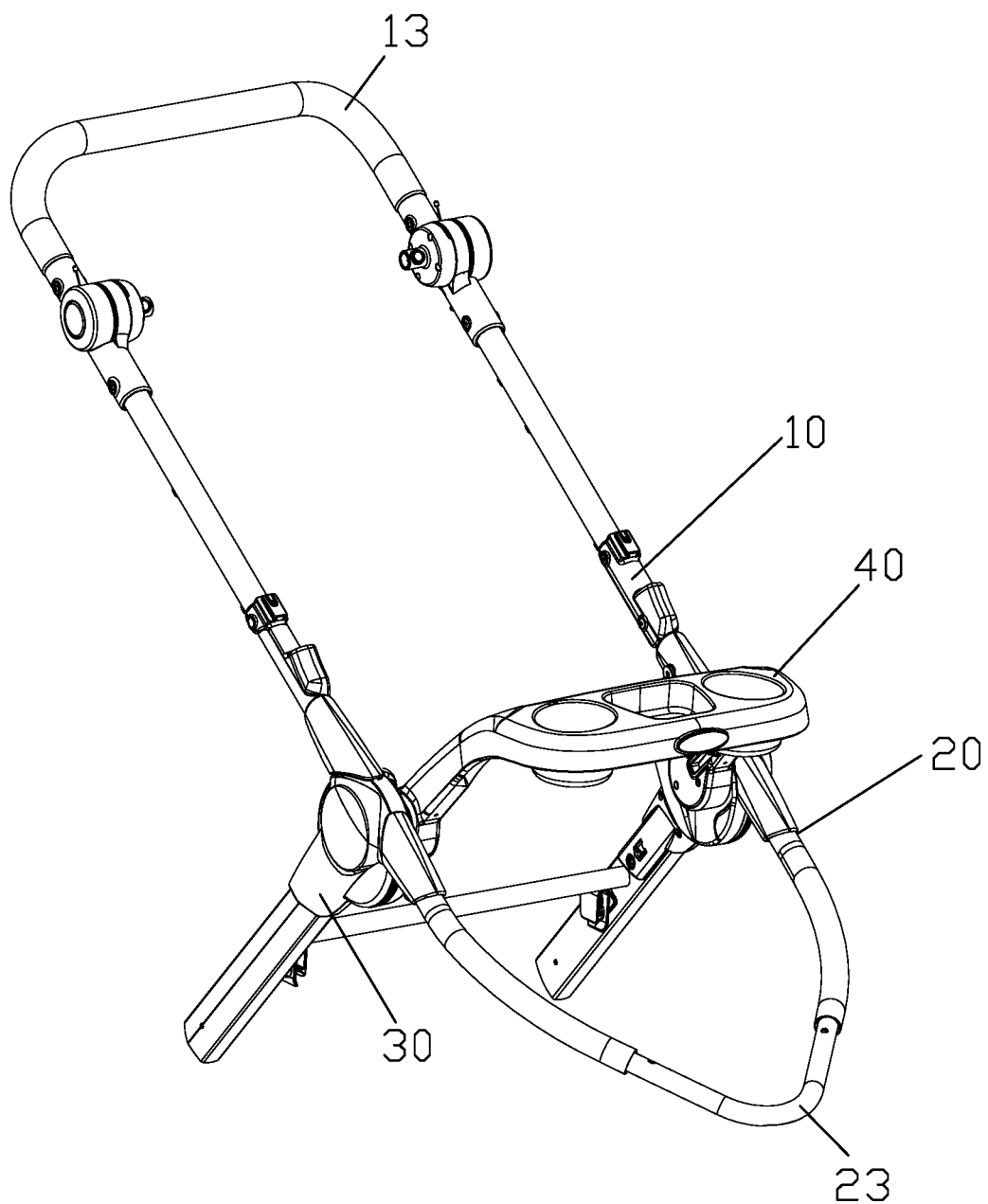
FIG. 1 is a perspective view of an embodiment of a stroller frame according to the disclosure.
Figure 2:
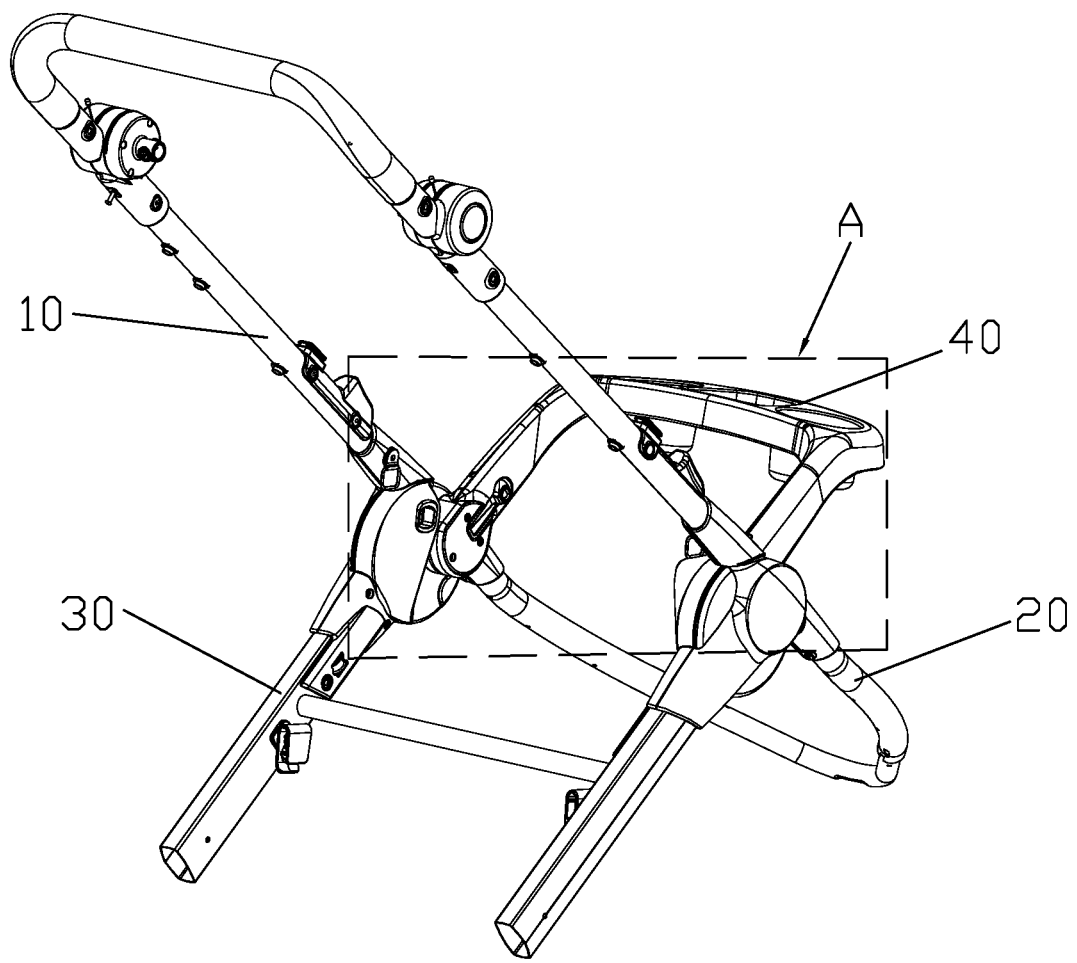
FIG. 2 is a perspective view of the embodiment taken from another angle.
Figure 3:
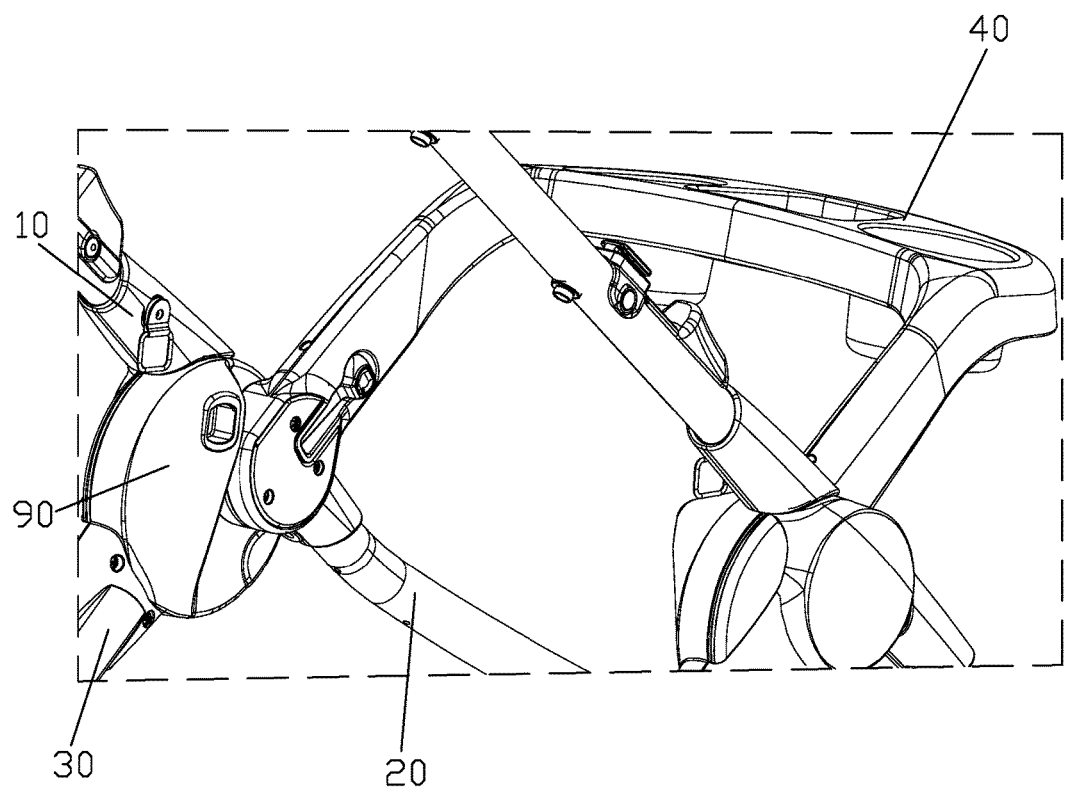
FIG. 3 is an enlarged view of a portion (A) of FIG. 2.
Figure 4:
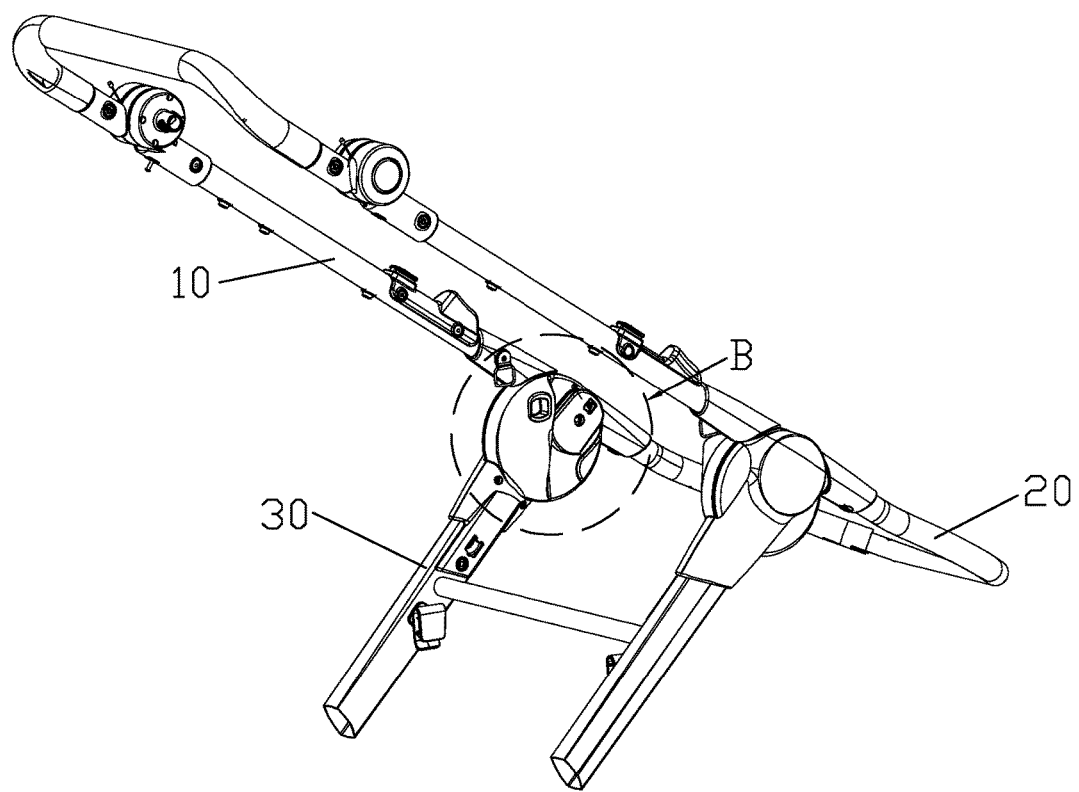
FIG. 4 is a perspective view of the embodiment, a tray thereof being removed for the sake of clarity.
Figure 5:
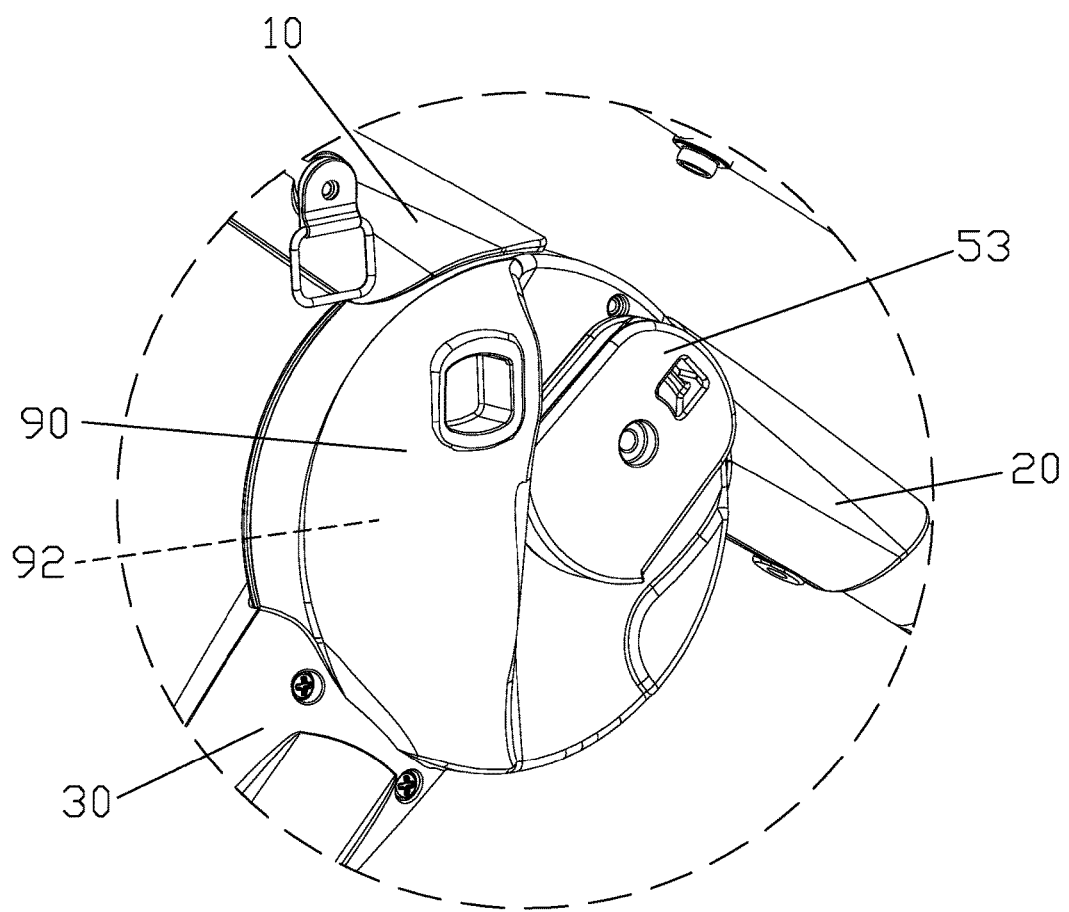
FIG. 5 is an enlarged view of a portion (B) of FIG. 4.
Figure 6:
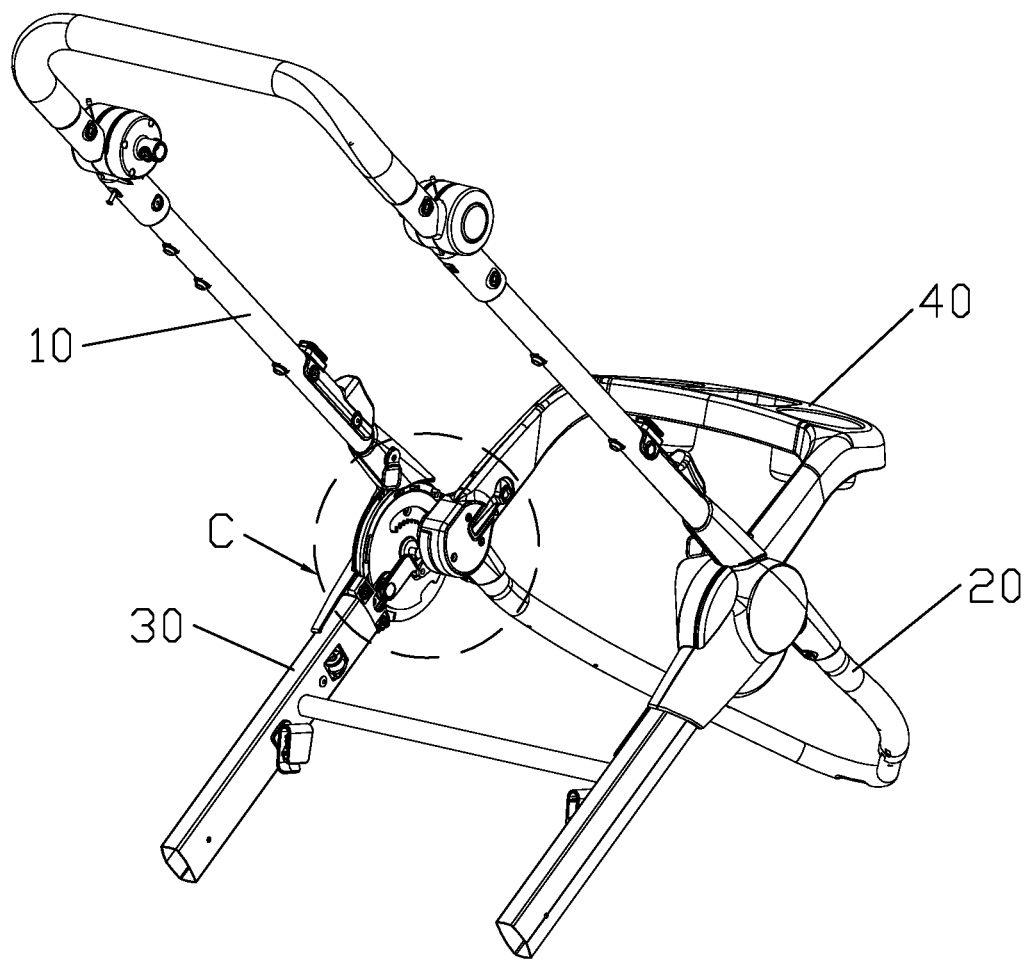
FIG. 6 is a perspective view of the embodiment, a joint housing thereof being removed for sake of clarity.
Figure 7:
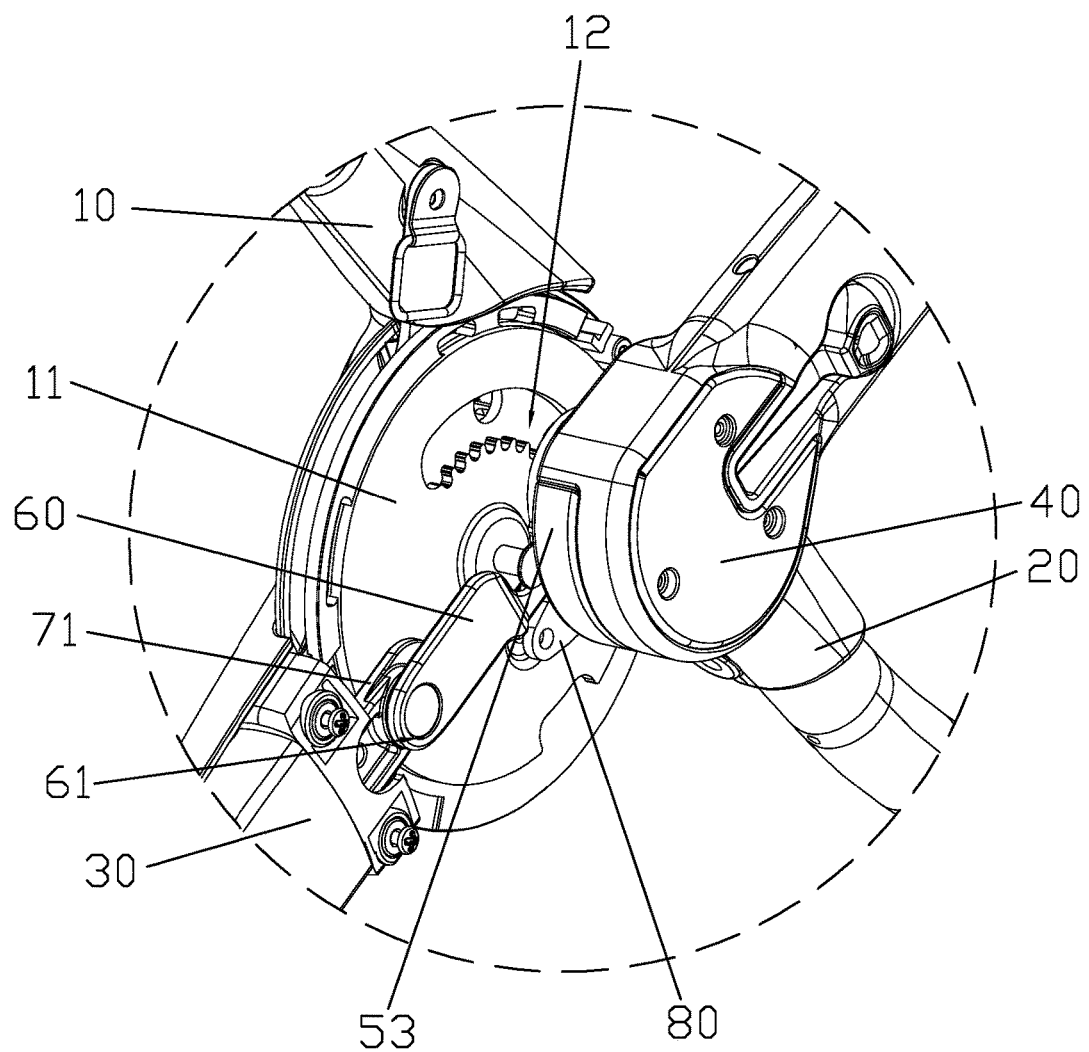
FIG. 7 is an enlarged view of a portion (C) of FIG. 6.
Figure 8:
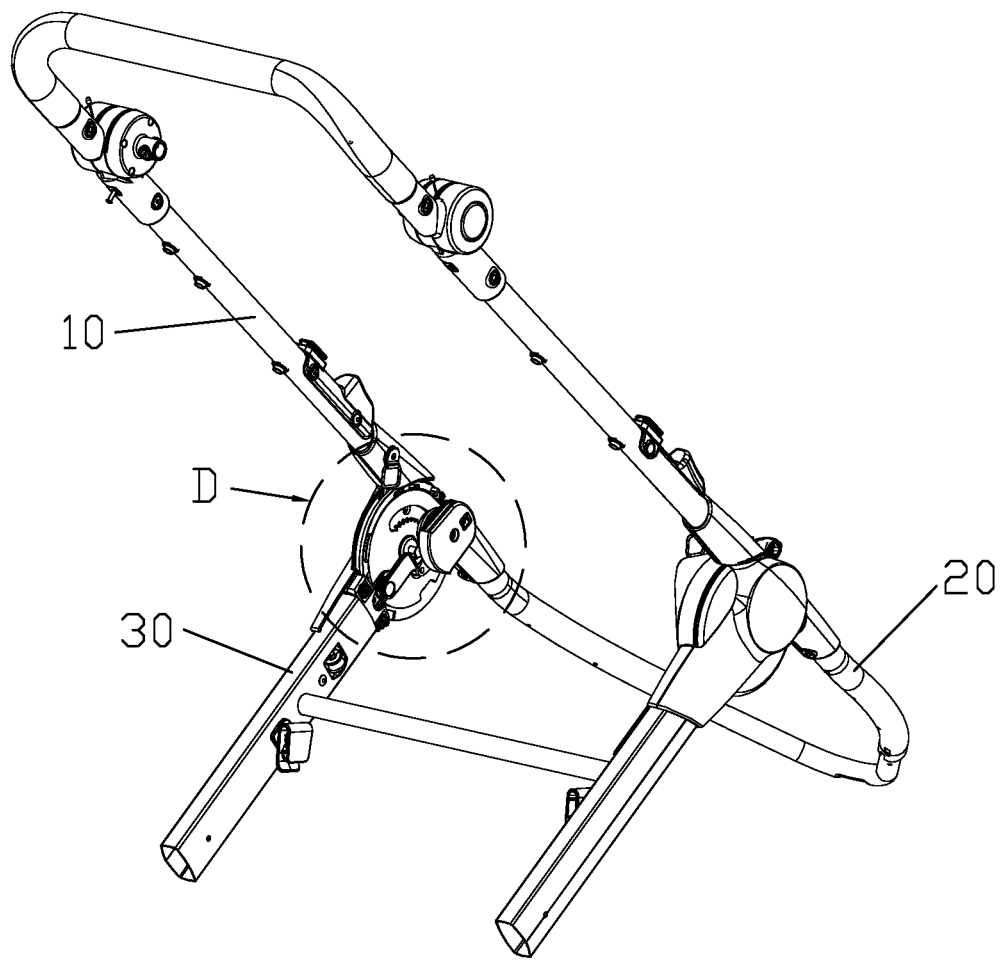
FIG. 8 is a perspective view of the embodiment, the tray and the joint housing thereof being removed for the sake of clarity.
Figure 9:
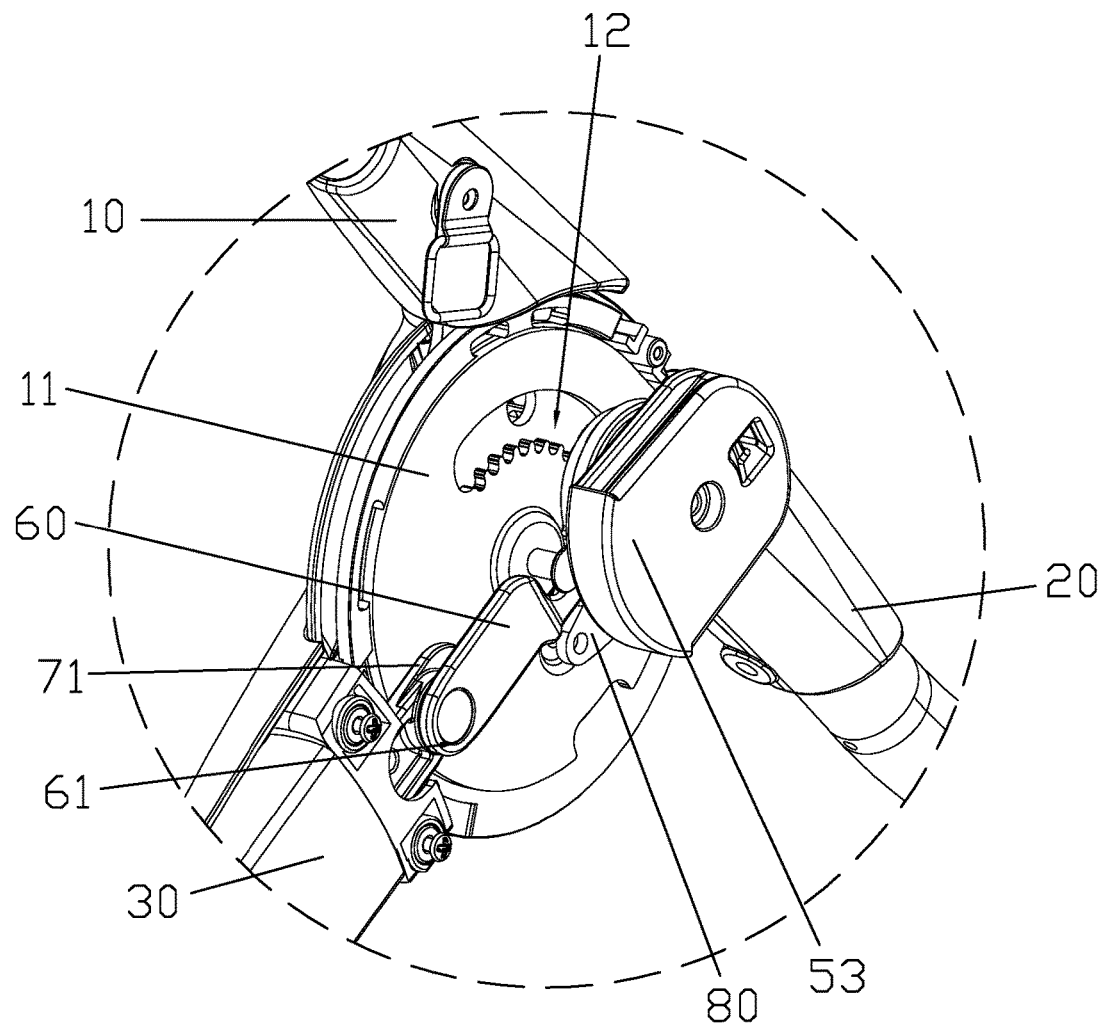
FIG. 9 is an enlarged view of a portion (D) of FIG. 8.
Figure 10:
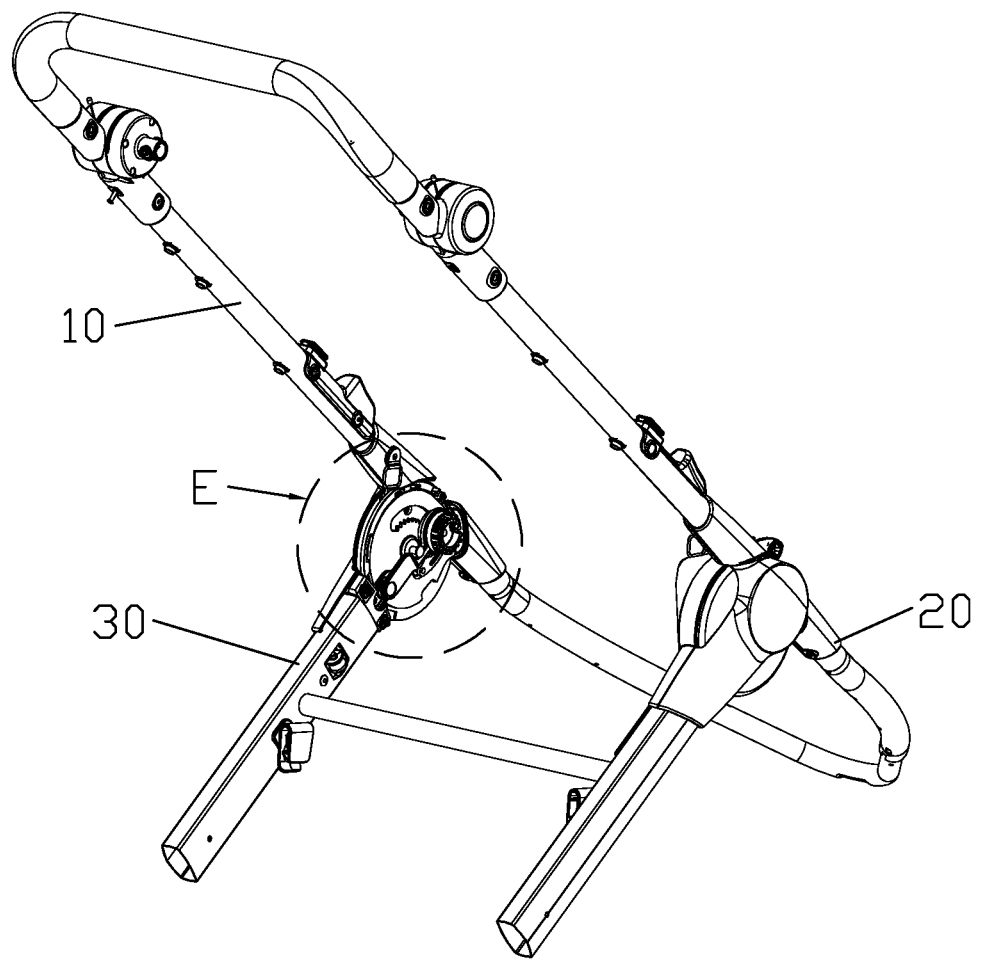
FIG. 10 is a perspective view of the embodiment, the tray, the joint housing and a tray mounting member thereof being removed for the sake of clarity.
Figure 11:
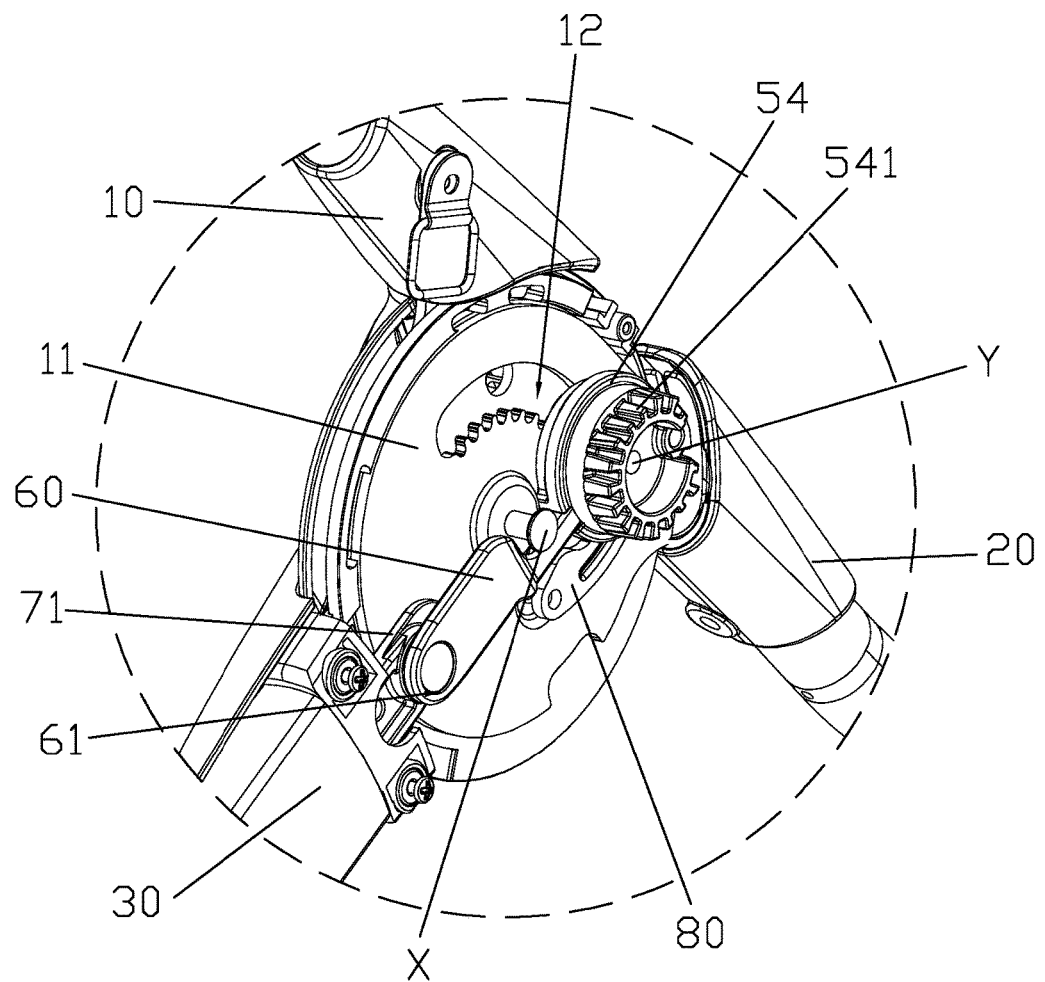
FIG. 11 is an enlarged view of a portion (E) of FIG. 10.
Figure 12:
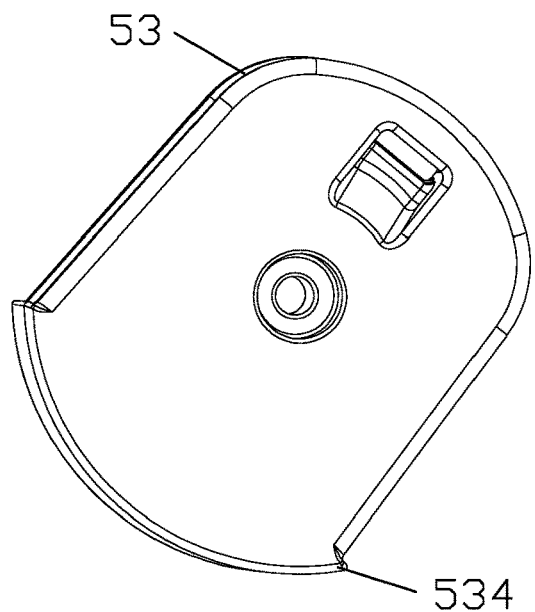
FIG. 12 is a perspective view of the tray mounting member of the embodiment.
Figure 13:
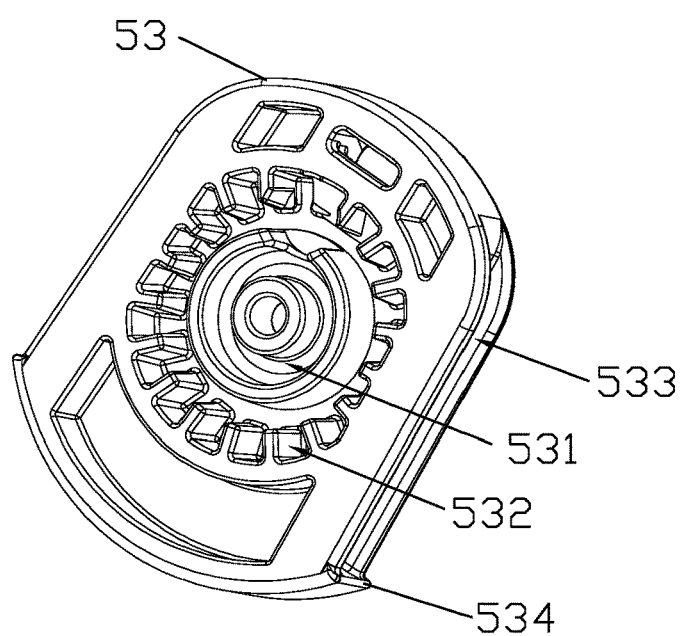
FIG. 13 is a perspective view of the tray mounting member taken from another angle.

FIGS. 1 to 16 illustrate a stroller frame of an embodiment according to the disclosure. In this embodiment, the stroller frame 100 includes a handle assembly 10, a front leg assembly 20, a rear leg assembly 30, a tray 40, a tray mounting assembly 50 and a tray latching assembly 60. The handle assembly 10 has a first rotating end hub 11 and a first distal end 13. The front leg assembly 20 has a second rotating end hub 21 and a second distal end 23. The second rotating end hub 21 is pivotably connected with the first rotating end hub 11 about a hub axis (X) to be rotated relative to the first rotating end hub 11 so as to allow the stroller frame 100 to transform between a folded state, where the first and second distal ends 13, 23 are close to each other, and an unfolded state, where the first and second distal ends 13, 23 are remote from each other. The tray mounting assembly 50 is coupled with the tray 40, and is rotatably mounted on one of the first and second rotating end hubs 11, 21 such that the tray mounting assembly 50 is rotated relative to the one of the first and second rotating end hubs 11, 21 when the second rotating end hub 21 is rotated relative to the first rotating end hub 11 to move the stroller frame 100 to one of the folded and unfolded states, thereby converting the tray 40 to one of a folded position and an unfolded position, as described in greater detail below. The tray latching assembly 60 is disposed to retain and support the tray mounting assembly 50 when the stroller frame 100 is in the unfolded state so as to keep the tray 40 in the unfolded position. With the tray mounting assembly 50 connecting the tray 40 with the handle assembly 10 or the front leg assembly 20, and with the tray latching assembly 60 retaining and supporting the tray mounting assembly 50 when the stroller frame 100 is in the unfolded state, the tray 40 can be kept stable to avoid undesired swaying. Specifically, the tray mounting assembly 50 has a peripheral surface 51 surrounding a central axis (Y) which is offset from and parallel to the hub axis (X) and about which the tray mounting assembly 50 is rotated, and a recess 511 concaved from the peripheral surface 51 toward the central axis (Y). The tray latching assembly 60 has a latch end 601 which is operatively engaged in the recess 511 to retain and support the tray mounting assembly 50 when the stroller frame 100 is in the unfolded state. The latch end 601 can be operated to separate from the recess 511 to allow folding of the stroller frame 100. Specifically, the rear leg assembly 30 has a third rotating end hub 31 coaxially and pivotably connected with the first and second rotating end hubs 11, 21 about the hub axis (X).

Figure 14:
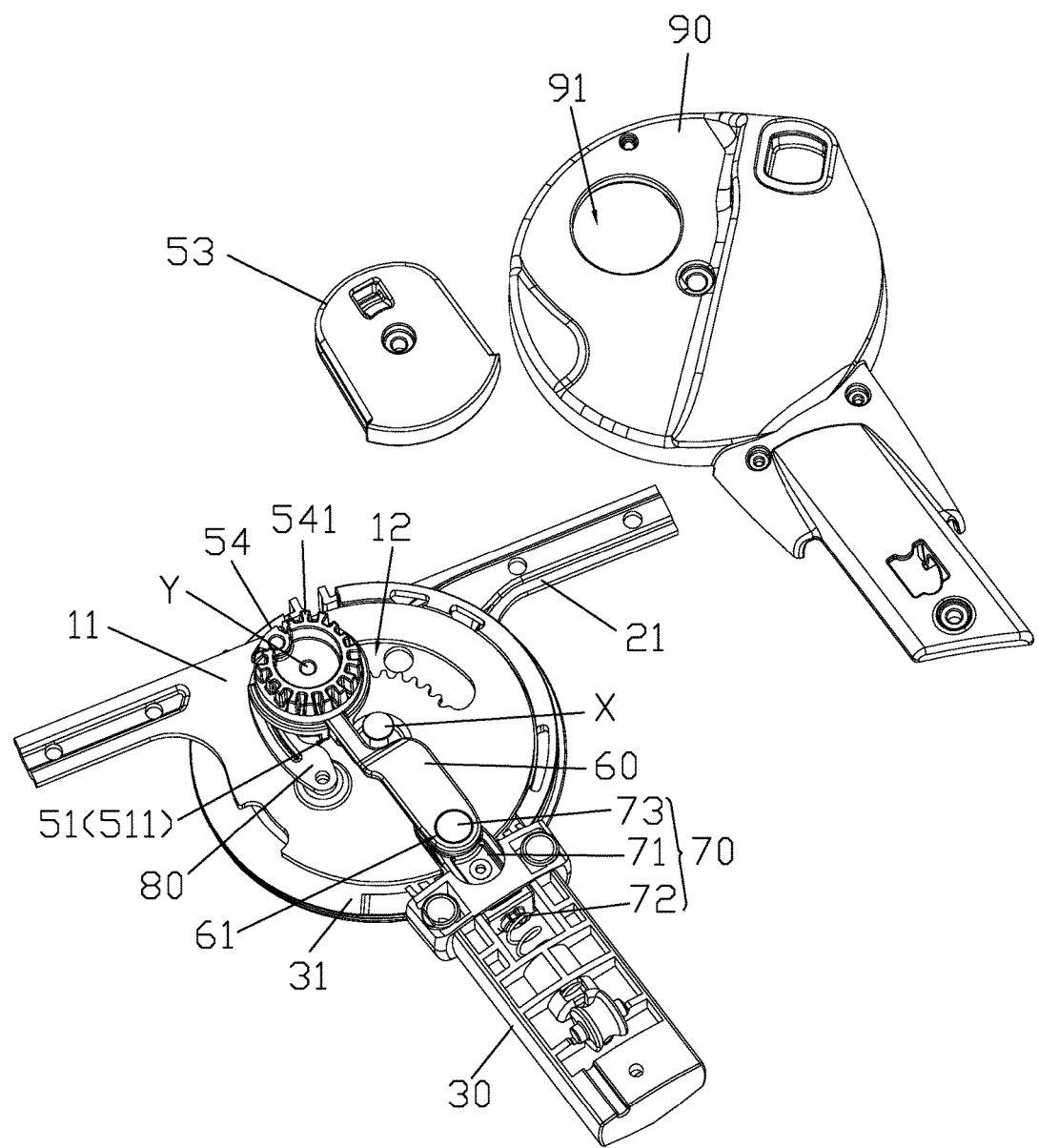
FIGS. 14 to 16 are fragmentary, partly exploded perspective views of the embodiment, respectively.
Figure 15:
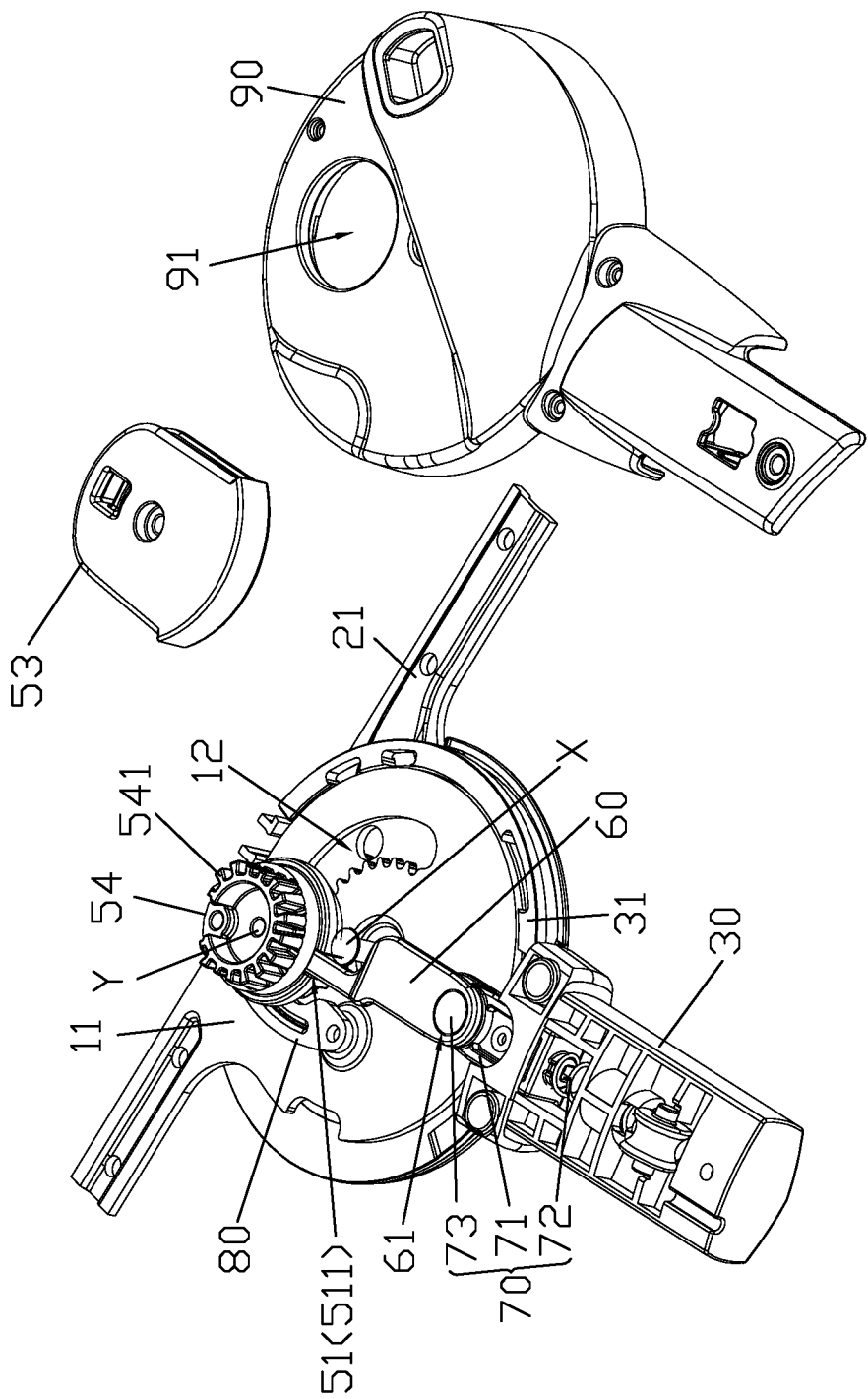
Figure 16:
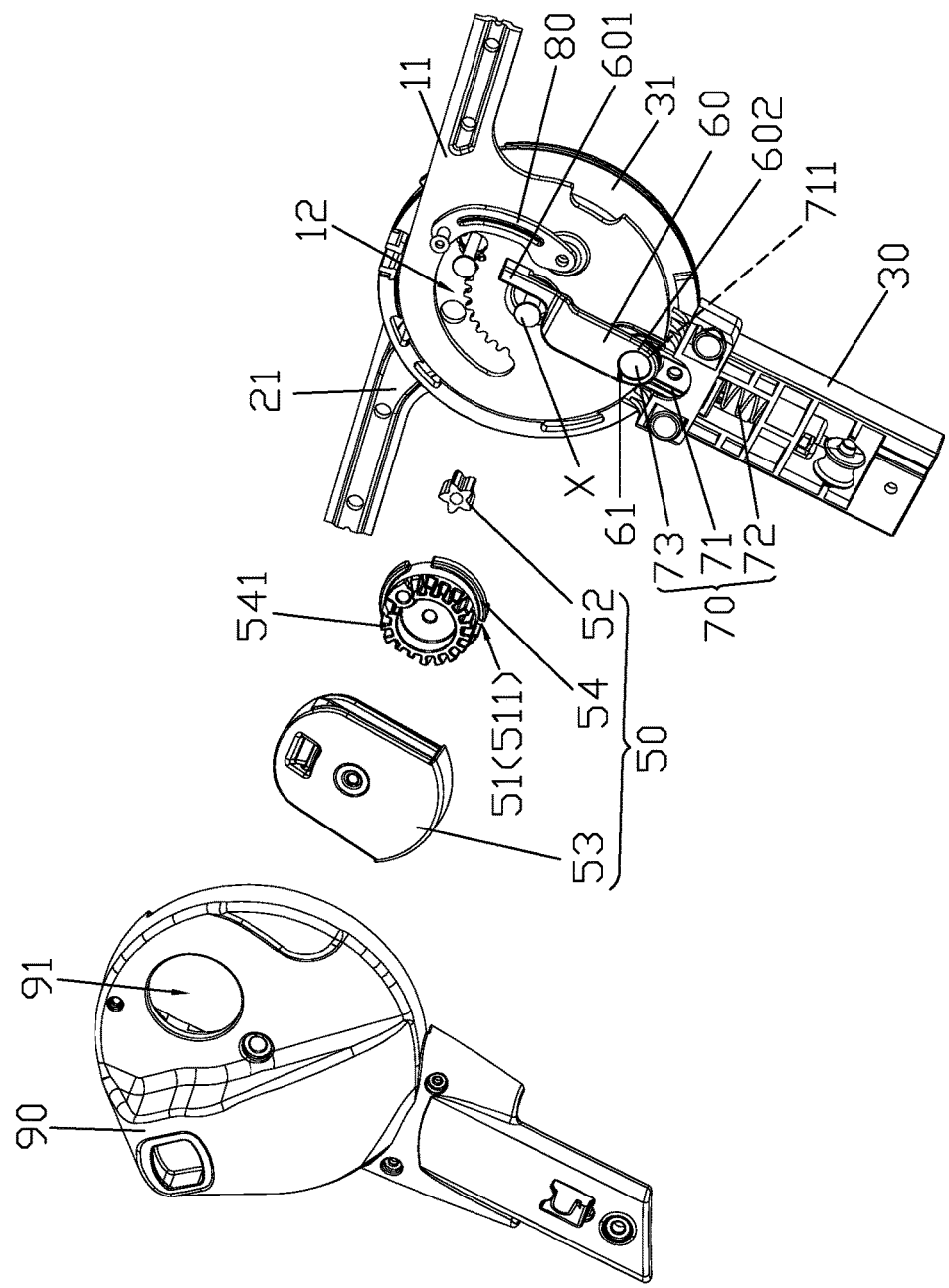

With reference to FIGS. 14 to 16, the stroller frame 100 further includes a frame latching assembly 70 disposed on the rear leg assembly 30. The frame latching assembly 70 is operative to latch the first and second rotating end hubs 11, 21 to guard rotation relative thereto when the stroller frame 100 is in the unfolded state. Specifically, the frame latching assembly 70 includes a pulling rod 71 which is connected with the tray latching assembly 60 to synchronously move the tray latching assembly 60 in an unlatching direction to disengage from the tray mounting assembly 50, when the frame latching assembly 70 is operated to unlatch the first and second rotating end hubs 11, 21, so as to allow folding of the tray 40 through rotation of the tray mounting assembly 50, and to move the tray latching assembly 60 in a latching direction to retain and support the tray mounting assembly 50, when the stroller frame is in the unfolded state, so as to prevent swaying of the tray 40. The frame latching assembly 70 also includes a biasing member 72 which is disposed in the rear leg assembly 30 and which has an end abutting against the pulling rod 71, and an opposite end abutting against the rear leg assembly 30 so as to bias the pulling rod 71 and the tray latching assembly 60 in the latching direction. More particularly, the frame latching assembly 70 further includes a latch pin 73. The pulling rod 71 is formed with a first pin hole 711. The latch pin 73 is inserted into the first pin hole 711, and is operatively movable to be inserted into retaining holes (not shown) of the first and second rotating end hubs 11, 21 when the stroller frame 100 is in the unfolded state where the retaining holes are aligned with each other, and to be disengaged from the first and second rotating end hubs 11, 21 to unlatch the first and second rotating end hubs 11, 21 to allow relative rotation of the first and second rotating end hubs 11, 21. Moreover, the tray latching assembly 60 has a second pin hole 61 formed at a connecting end 602. The latch pin 73 is also inserted into the second pin hole 61 to connect the tray latching assembly 60 with the pulling rod 71. Thus, with the latch pin 73 inserted into the first and second pin holes 711, 61 and operative to be inserted into the first and second rotating end hubs 11, 21, the tray latching assembly 60 is operated along with operation of the frame latching assembly 70 to retain and support the tray mounting assembly 50 or to be disengaged from the tray mounting assembly 50.

With reference to FIGS. 14 to 16, the one of the first and second rotating end hubs 11, 21 is formed with an arcuate rack 12 which extends around the hub axis (X). The tray mounting assembly 50 has a pinion 52 which meshes with the arcuate rack 12 to be moved and rotated relative to the arcuate rack 12. The pinion 52 is disposed at the central axis (Y) to be rotated about the central axis (Y) when moved along the arcuate rack 12 so as to transmit a torque to turn the tray 40. Thus, the tray 40 can be folded and unfolded along with the folding and unfolding of the stroller frame 100. In this embodiment, the tray mounting assembly 50 is mounted on the first rotating end hub 11 and the arcuate rack 12 is formed on the first rotating end hub 11 so that the tray 40 is folded and unfolded along with the folding and unfolding of the handle assembly 10. Specifically, the stroller frame 100 further includes a transmitting linkage 80 which has an end that is pivotably connected with the one of the first and second rotating end hubs 11, 21 and offset from the hub axis (X), and an opposite end that is pivotably connected with the tray mounting assembly 50 and offset from the central axis (Y). With the transmitting linkage 80, the tray mounting assembly 50 can be driven to reliably rotate about the central axis (Y) relative to the one of the first and second rotating end hubs 11, 21 along with rotation of the one of the first and second rotating end hubs 11, 21 about the hub axis (X). In this embodiment, the transmitting linkage 80 is disposed between the tray mounting assembly 50 and the first rotating end hub 11.

With reference to FIGS. 8 to 15, the tray mounting assembly 50 has a rotating member 54 which is rotatable relative to the first and second rotating end hubs 11, 21, and a tray mounting member 53 which is retainingly connected to the rotating member 54 and which is coupled with the tray 40. Specifically, the rotating member 54 has engaging teeth 541 at a periphery thereof. The tray mounting member 53 has a central slot 531 and a plurality of engaging grooves 532 at a periphery thereof. The rotating member 54 is configured to be retained in the central slot 531 to have the engaging teeth 541 respectively engage with the engaging grooves 532 in an axial direction parallel to the hub axis (X) to guard against rotation relative to each other.

With reference to FIGS. 2 to 5 and FIGS. 12 to 16, the stroller frame 100 further includes a joint housing 90 defining therein a space 92 for accommodating the first and second rotating end hubs 11, 21, the tray mounting assembly 50 and the tray latching assembly 60. The joint housing 90 has a confining hole 91 which extends therethrough and in spatial communication with the space 92. The tray mounting assembly 50 is confined by the confining hole 91 to partially project outwardly of the joint housing 90 from the confining hole 91 in the axial direction to be coupled with the tray 40. Specifically, the rotating member 54 is confined by the confining hole 91 and partially projects outwardly of the joint housing 90 such that the tray mounting member 53, which is retainingly connected to the rotating member 54, is disposed outwardly of the joint housing 90 to be coupled with the tray 40. Specifically, the tray mounting member 53 has a pair of mounting slots 533 each of which extends in a mounting direction that is transverse to the axial direction, and terminates at a stop portion 534. The tray 40 has a tray mounting end which is in spline engagement with the mounting slots 533 and positioned by the stop portions 534 so as to rotate with the tray mounting assembly 50.

As illustrated, with the tray latching assembly 60 retaining and supporting the tray mounting assembly 50 when the stroller frame is in the unfolded state, the tray 40 can be kept stable in the unfolded position to avoid undesired swaying of the tray 40, thereby preventing objects placed on the tray 40 from falling, which may hurt the child seated on the stroller.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements. For example, the pulling rod 71 may be integrally formed with the tray latching assembly 60.

What is claimed is:

1. A stroller frame comprising:
    a handle assembly having a first rotating end hub and a first distal end;
    a front leg assembly having a second rotating end hub and a second distal end, said second rotating end hub being pivotably connected with said first rotating end hub about a hub axis to be rotated relative to said first rotating end hub so as to allow said stroller frame to transform between a folded state, where said first and second distal ends are close to each other, and an unfolded state, where said first and second distal ends are remote from each other;
a rear leg assembly pivotably connected with said front leg assembly;
a tray;
a tray mounting assembly coupled with said tray, and rotatably mounted on one of said first and second rotating end hubs such that said tray mounting assembly is rotated relative to said one of said first and second rotating end hubs when said second rotating end hub is rotated relative to said first rotating end hub to move said stroller frame to one of the folded and unfolded states, thereby converting said tray to one of a folded position and an unfolded position, said tray mounting assembly having a peripheral surface surrounding a central axis which is offset from and parallel to the hub axis and about which said tray mounting assembly is rotated, and a recess concaved from said peripheral surface toward the central axis;
a tray latching assembly having a latch end which is operatively engaged in said recess to retain and support said tray mounting assembly when said stroller frame is in the unfolded state so as to keep said tray in the unfolded position.

2. The stroller frame as claimed in claim 1, wherein said rear leg assembly has a third rotating end hub coaxially and pivotably connected with said first and second rotating end hubs about the hub axis.

3. The stroller frame as claimed in claim 1, further comprising a frame latching assembly which is disposed on said rear leg assembly and which is operative to latch said first and second rotating end hubs to guard rotation relative thereto when said stroller frame is in the unfolded state.

4. The stroller frame as claimed in claim 3, wherein said frame latching assembly includes a pulling rod which is connected with said tray latching assembly to synchronously move said tray latching assembly in an unlatching direction to disengage from said tray mounting assembly when said frame latching assembly is operated to unlatch said first and second rotating end hubs, and to move said tray latching assembly in a latching direction to retain and support said tray mounting assembly when said stroller frame is in the unfolded state.

5. The stroller frame as claimed in claim 4, wherein said frame latching assembly includes a biasing member having an end which abuts against said pulling rod and an opposite end which abuts against said rear leg assembly so as to bias said pulling rod and said tray latching assembly in the latching direction.

6. The stroller frame as claimed in claim 5, wherein said frame latching assembly includes a latch pin, said pulling rod being formed with a first pin hole, said latch pin being inserted into said first pin hole and being operatively movable to be inserted into said first and second rotating end hubs when said stroller frame is in the unfolded state, and to be disengaged from said first and second rotating end hubs to unlatch said first and second rotating end hubs.

7. The stroller frame as claimed in claim 6, wherein said tray latching assembly has a second pin hole formed at a connecting end, said latch pin being inserted into said second pin hole to connect said tray latching assembly with said pulling rod.

8. The stroller frame as claimed in claim 1, wherein said one of said first and second rotating end hubs is formed with an arcuate rack which extends around the hub axis, said tray mounting assembly having a pinion which meshes with said arcuate rack to transmit a torque to turn said tray.

9. The stroller frame as claimed in claim 8, further comprising a transmitting linkage which has an end that is pivotably connected with said one of said first and second rotating end hubs and offset from the hub axis, and an opposite end that is pivotably connected with said tray mounting assembly and offset from a central axis of said tray mounting assembly so as to allow said tray mounting assembly to rotate about the central axis relative to said one of said first and second rotating end hubs along with rotation of said one of said first and second rotating end hubs about the hub axis.

10. The stroller frame as claimed in claim 9, wherein said pinion is disposed at and rotated about the central axis when moved along said arcuate rack.

11. The stroller frame as claimed in claim 1, wherein said tray mounting assembly has a rotating member which is rotatable relative to said first and second rotating end hubs, and a tray mounting member which is retainingly connected to said rotating member and which is coupled with said tray.

12. The stroller frame as claimed in claim 11, wherein said rotating member and said tray mounting member have engaging teeth and grooves which are engaged with each other in an axial direction parallel to the hub axis to guard against rotation relative to each other.

13. The stroller frame as claimed in claim 1, further comprising a joint housing defining therein a space for accommodating said first and second rotating end hubs, said tray mounting assembly and said tray latching assembly, and having a confining hole which extends therethrough and in spatial communication with said space, said tray mounting assembly being confined by said confining hole and partially projecting outwardly of said joint housing from said confining hole in an axial direction parallel to the hub axis to be coupled with said tray.

14. The stroller frame as claimed in claim 13, wherein said tray mounting assembly has a rotating member which is rotatable relative to said first and second rotating end hubs and which is confined by said confining hole and which partially projects outwardly of said joint housing, and a tray mounting member which is retainingly connected to said rotating member and which is disposed outwardly of said joint housing to be coupled with said tray.

15. The stroller frame as claimed in claim 14, wherein said tray mounting member has a pair of mounting slots each of which extends in a mounting direction that is transverse to the axial direction and terminates at a stop portion, said tray having a tray mounting end which is in spline engagement with said mounting slots and positioned by said stop portions so as to rotate with said tray mounting assembly.

* * * * *